(12) United States Patent
Ramarao

(10) Patent No.: US 9,043,943 B1
(45) Date of Patent: May 26, 2015

(54) SELF-DESTRUCTING CONTENT

(71) Applicant: Shreenidhi Ramarao, Bangalore (IN)

(72) Inventor: Shreenidhi Ramarao, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 1 day.

(21) Appl. No.: 13/630,887

(22) Filed: Sep. 28, 2012

(51) Int. Cl.
*G06F 7/04* (2006.01)
*G06F 7/06* (2006.01)
*G06F 17/30* (2006.01)
*G06F 21/60* (2013.01)
*G06F 21/10* (2013.01)

(52) U.S. Cl.
CPC ............... *G06F 21/60* (2013.01); *G06F 21/10* (2013.01)

(58) Field of Classification Search
CPC .................................. G06F 21/60; G06F 21/10
USPC ............................................................. 726/29
See application file for complete search history.

(56) References Cited

U.S. PATENT DOCUMENTS

| | | | |
|---|---|---|---|
| 7,830,399 B2 * | 11/2010 | Benson et al. | 345/619 |
| 8,516,590 B1 * | 8/2013 | Ranadive et al. | 726/24 |
| 2002/0095598 A1 * | 7/2002 | Camble et al. | 713/200 |
| 2006/0020829 A1 * | 1/2006 | Asano et al. | 713/193 |
| 2008/0147595 A1 * | 6/2008 | Rjaibi | 707/2 |
| 2009/0300312 A1 * | 12/2009 | Handschuh et al. | 711/166 |
| 2012/0278579 A1 * | 11/2012 | Goss et al. | 711/166 |

\* cited by examiner

*Primary Examiner* — Dant Shaifer Harriman
(74) *Attorney, Agent, or Firm* — Van Pelt, Yi & James LLP

(57) ABSTRACT

Protecting sensitive content, such as business critical documents or other computer files, is disclosed. In various embodiments, upon receiving an indication that a threat pattern associated with a content item has been matched, the protected content "self-destructs", such as rendering the content item inaccessible, e.g., at a client and/or to a particular user or group of users.

21 Claims, 5 Drawing Sheets

SELF-DESTRUCTING CONTENT

BACKGROUND OF THE INVENTION

Security of the business critical documents that are sent or shared over network like a new product design is important. Files falling into the possession of unintended users (internal or external, hackers, competitors, etc.) might result in significant competitive, financial, or other damage or loss to an enterprise. Information rights management (IRM) and other techniques may be used to protect documents, but in typical approaches it may be possible for an unintended user to receive an IRM-protected (or other protected) copy and a malicious user may gain access to the authorized user's credential or may be able to use offline tools to gain unprotected access to the content.

BRIEF DESCRIPTION OF THE DRAWINGS

Various embodiments of the invention are disclosed in the following detailed description and the accompanying drawings.

DETAILED DESCRIPTION

Figure 1:
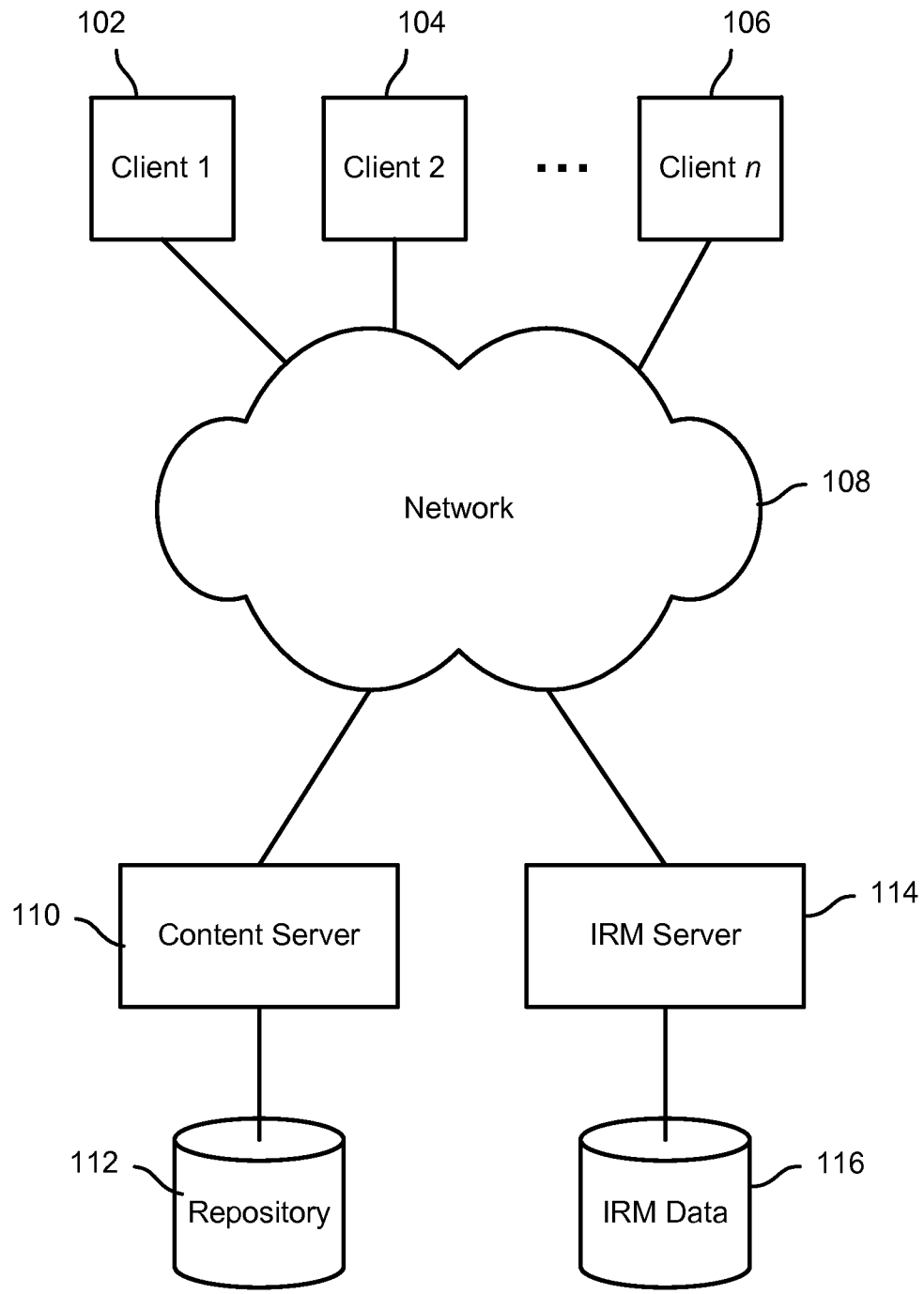
FIG. 1 is a block diagram illustrating an embodiment of a content management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Self-destruction of business critical documents is disclosed. In various embodiments, self-destruction is triggered based at least in part on security threat pattern matching. In some embodiments, an information rights management (IRM) or other service is leveraged to implement and use the disclosed feature. This can prevent documents from falling into the wrong hands based on security threat pattern matching.

In some embodiments, there is a configurable field in the protection wizard for a document which if set results in the document being treated as extremely confidential. Documents protected with this configurable item to be true are protected in various embodiments by a service or other mechanism that results in their self-destruction based on security threat pattern matching. In various embodiments, self-destruction may be performed locally, e.g., at a client to which the document or other content has been downloaded, or by operation of a remote service, for example one that renders the document inaccessible at or to a client in response to a security threat pattern being matched.

The following are some of the variables that may be considered to develop a security threat pattern (single variable or multiple variables) in various embodiments: time restrictions, network restrictions, permissions, user restrictions, wrong password attempts, etc. By way of example, a document is protected with a security restriction to be opened between only certain times in the day, e.g., between 10 AM and 11 AM on some given date or day of the week. While the protection was being defined, for example via a content security wizard, the document was marked as "extremely confidential" or some other designation with which self-destruction is associated. If anyone tries to open this document apart from the authorized time and day, a security pattern defined to impose the time/day restriction is determined to be matched, resulting in various embodiments in self-destruction of the document, for example the document is replaced on or as available to the client with content in a format that is not usable at the client. In some embodiments, before self-destructing real time data of who tried to view to document, from which Internet protocol (IP) address, etc. is sent to a server administrator. In some embodiments, an extracted format of the original document is sent to the IRM server for backup, to protect against loss of the latest version of the document or other content, which once backed up to the server is self-destructed at the client, for example by replacing the document at the client with an unusable format.

FIG. 1 is a block diagram illustrating an embodiment of a content management system. In the example shown, a plurality of clients, represented in FIG. 1 by clients 102, 104, and 106, access, via network 108, content associated with a content server 110 and stored in a repository 112. An IRM server 114 uses IRM data 116 to monitor and control access to and/or use of content made accessible via content server 110 and repository 112, for example to ensure that content intended to be accessible only to authorized users is only accessed by such users.

Figure 2:
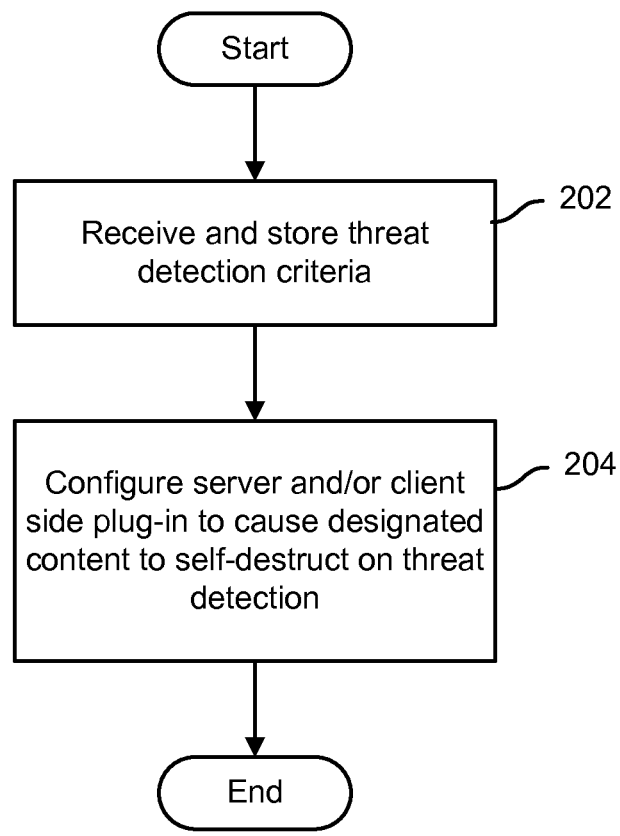
FIG. 2 is a flow chart illustrating an embodiment of a process to protect against unauthorized access to sensitive content.

FIG. 2 is a flow chart illustrating an embodiment of a process to protect against unauthorized access to sensitive content. In the example shown, threat detection criteria are received and stored (202). For example, in some embodiments, an administrative interface is provide to enable an administrator to define the types of security restrictions that users will be provided an opportunity to designate for a document, for example via a security wizard or other interface, in connection with creating and saving the document, such as to a content management system or other repository. In connection with configuring protection for a particular document, folder, or other content or set of content, a user selects or otherwise specifies a type of protection and, where applicable, associated attributes. For example, in one of the examples mentioned above a user may select an option to impose a day/time restriction and may enter or otherwise provide values to designate that access is to be provided only at the days and/or times desired, such as weekdays between 9 am and 5 pm. In response to the designation, a threat pattern is defined and associated with the document(s) or other content, for example, a rule that is triggered if an attempt is made to access the document at a time or on a day other than as specified. In various embodiments, server and/or client side plugins and/or other components may be configured to cause the protected document(s) or other content to self-destruct in the event a threat is detected based on the stored pattern (204). For example, a client side plugin may be configured to render a copy of the document as stored at the client inaccessible, such as by substituting a document in an unusable format, in response to a threat pattern having been determined to have been matched.

Figure 3:
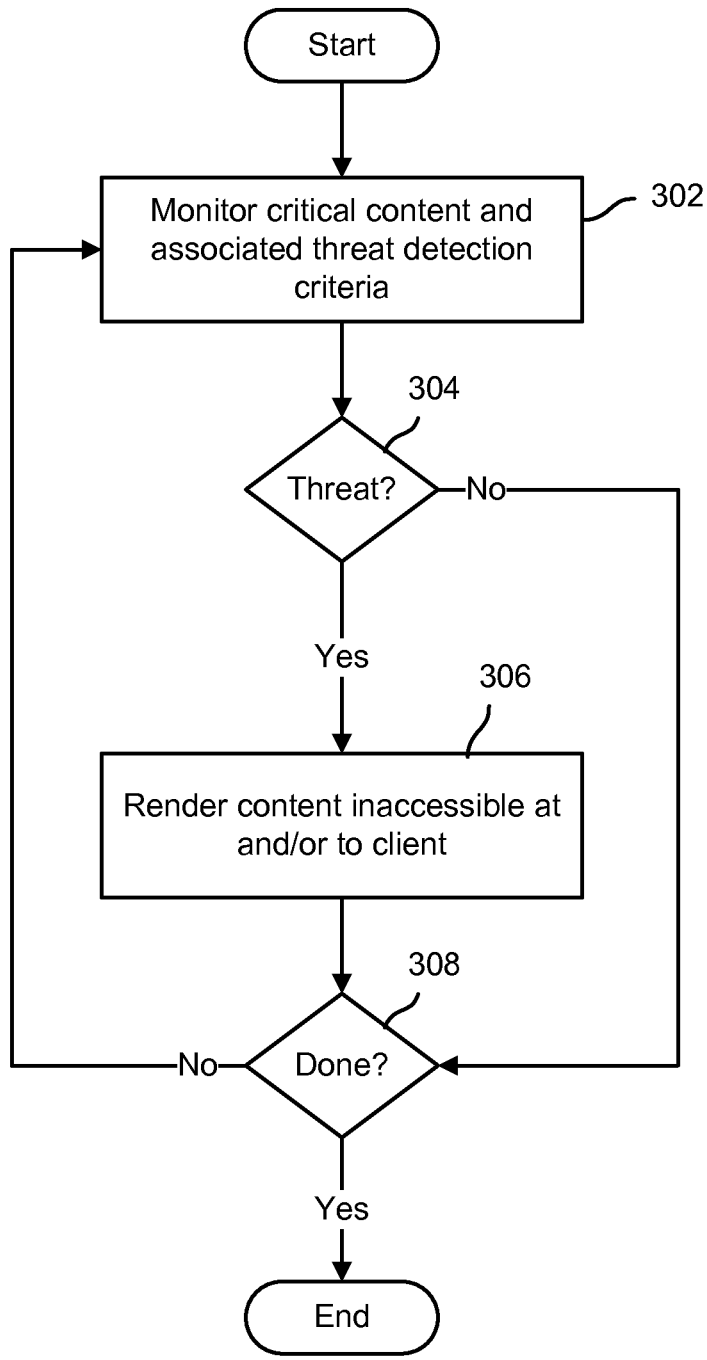
FIG. 3 is a flow chart illustrating an embodiment of a process to protect against unauthorized access to sensitive content.

FIG. 3 is a flow chart illustrating an embodiment of a process to protect against unauthorized access to sensitive content. In the example shown, documents or other content that has been designated as "business critical" or some other designation associated with a self-destruction protection as disclosed herein is monitored to determine whether associated threat detection criteria (patterns) have been matched (302). For example, if a day/time of access restriction has been applied, attempts to access the content are monitored and the day/time of any attempt to access is checked against the criteria to determine whether a threat pattern (i.e., attempt to access outside of approved day/time) has been matched. By way of further example, if a document is restricted to being accessed by nodes using an IP or other address, such as one in a statically configured and approved address range, then an attempt to access the document from a client having an IP address not in the approved range would trigger a determination that a threat pattern has been matched. Upon detecting a threat (304), the business critical document, or in some embodiments all business critical content on that client, if any, is rendered inaccessible at and/or to the client (306). For example, the protected content may be replaced by content in an unusable format, or a security data (e.g., key or associated data) required to access the content as stored at the client may be rendered inaccessible, unusable, and/or otherwise unavailable at the client. Monitoring of content, including by comparing actual access attempts to threat detection patterns, continues unless/until done (308), for example the system is shut down for maintenance.

Note that in various embodiments even an unauthorized user who has learned the secret credential of an authorized user may be foiled by techniques disclosed herein. For example, if the unauthorized user were to attempt to use the authorized user's credential to gain access to protected content, for example at a prohibited time or from a prohibited system or location, the unauthorized user, being unaware of the protections disclosed herein, would cause a corresponding threat pattern to be determined to have been matched, resulting in the content being rendered, inaccessible and/or otherwise auto-destructed, to the unauthorized user or others attempting to use the stolen credential.

Figure 4:
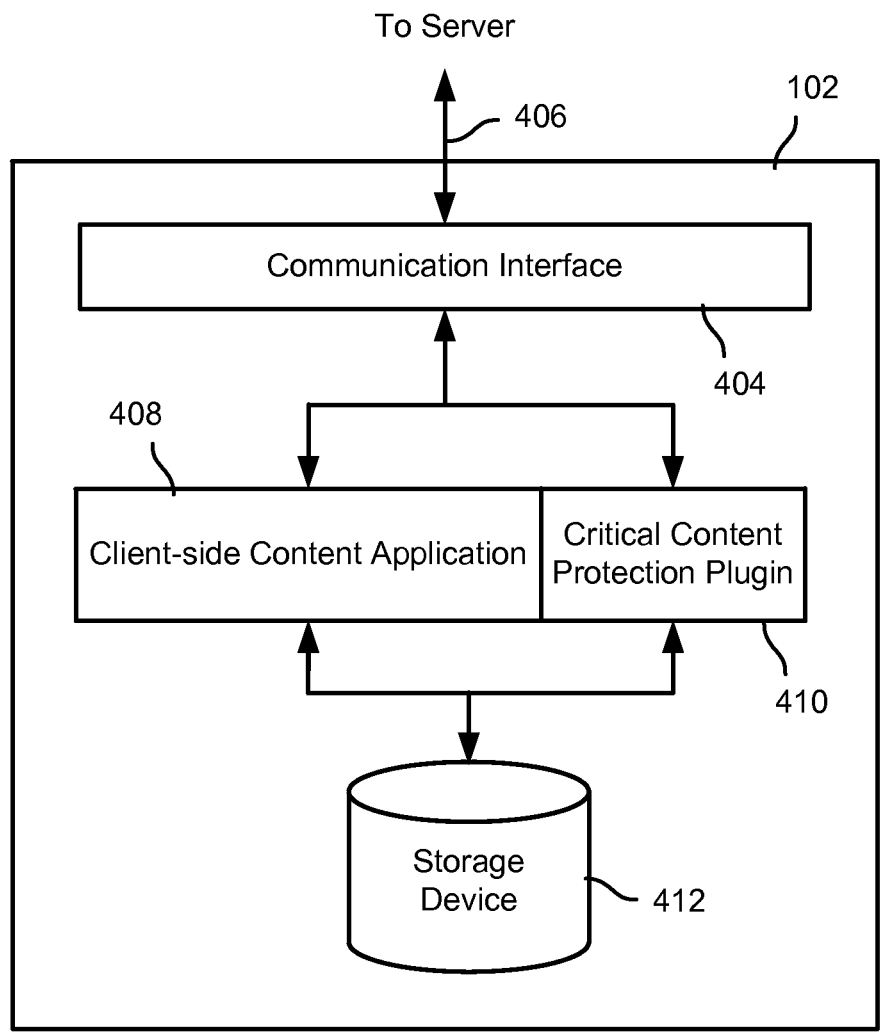
FIG. 4 is a block diagram illustrating an embodiment of a system to protect against unauthorized access to sensitive content.

FIG. 4 is a block diagram illustrating an embodiment of a system to protect against unauthorized access to sensitive content. In the example shown, client system 102 includes a communication interface 404, e.g., a network interface card or other interface, which provides network connectivity via a physical, wireless, or other connection 406. A client side content application 408, such as a content authoring application running on a content management or other application framework, communicates via the communication interface 404 and connection 406 with a remote content server (not shown in FIG. 4) to provide access to content stored in a remote repository with which the content server is associated. A critical content protection plugin (or other software) 410 provides content protection as disclosed herein, including in various embodiments by keeping track of which content at the client, for examples stored in memory, disk, or other storage device 412, such as by application 408, has been designated as "critical content"; monitoring to determine whether a threat pattern has been matched (e.g., access attempt outside authorized time of day); and causing self-destruction of critical content upon determining that a threat pattern has been matched (e.g., replacing critical content as stored on storage device 412 with an unusable format.

Figure 5:
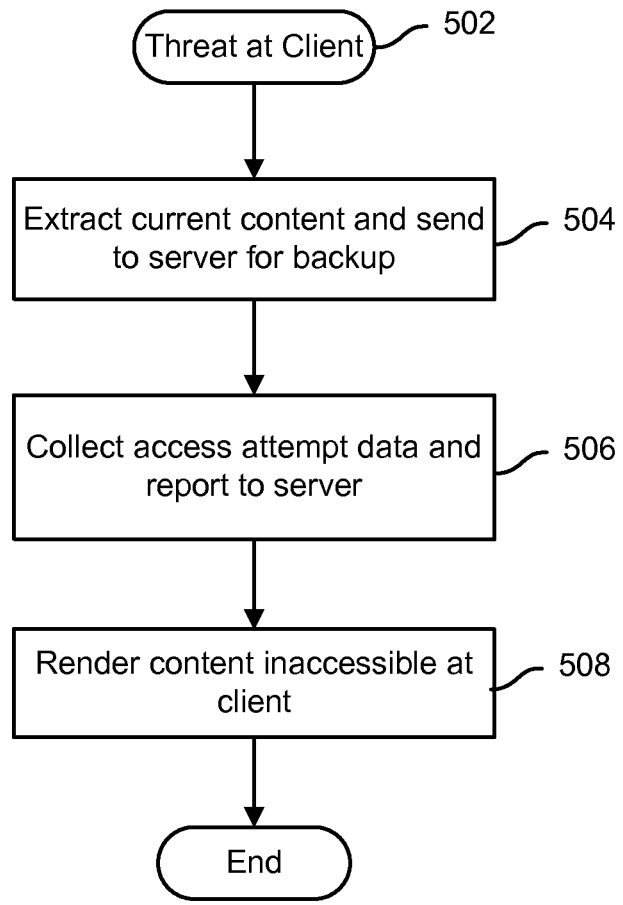
FIG. 5 is a flow chart illustrating an embodiment of a process to protect against unauthorized access to sensitive content.

FIG. 5 is a flow chart illustrating an embodiment of a process to protect against unauthorized access to sensitive content. In some embodiments, the process of FIG. 5 is implemented by a client side plugin and/or other client side component, such as critical content protection plugin 410 of FIG. 4. In the example shown in FIG. 5, upon detecting a threat at a protected client (502), the current content (i.e., most recently updated and/or saved locally at the client) is extracted and sent to a remote server, e.g., an IRM server, content server, or other server, for backup (504). Data associated with the access attempt that trigger the threat pattern match determination is collected and reported, e.g., to the IRM server (506). The content is rendered inaccessible at the client (508), e.g., replaced by an unusable format, etc.

In various embodiments, techniques disclosed herein will ensure, or at least reduce the possibility, that a business critical document or other content, like a new product design, a new drug composition etc., will not fall into the wrong hands, thereby helping companies avoid potentially huge financial and/or other losses.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of protecting content, comprising:
receiving, at a processor of a device, an indication that a threat pattern associated with a content item has been matched, wherein the threat pattern includes an unauthorized attempt to access the content item; and
in response to receiving the indication that the threat pattern associated with the content item has been matched, sending, to a remote server, a latest version of the content item as stored at a client, and
auto-destructing the content item in a selected manner that corresponds to the matched threat pattern to render the content item inaccessible at the client, wherein at least one other selected manner corresponds to an other threat pattern, and wherein at least one other content item is accessible at the client.

2. The method of claim 1, wherein the selected manner of auto-destructing the content item includes overwriting the content item as stored at the client.

3. The method of claim 1, wherein the selected manner of auto-destructing the content item includes replacing the content item as stored at the client with an unusable format.

4. The method of claim 1, wherein the selected manner of auto-destructing the content item includes deleting a security data required to access the content item as stored at the client.

5. The method of claim 4, wherein the security data is associated with a key required to decrypt the content item.

6. The method of claim 1, further comprising extracting and backing up to a remote server a latest version of the content item as stored at the client.

7. The method of claim 1, further comprising monitoring attempts to access the content item to determine whether the threat pattern has been matched.

8. The method of claim 1, further comprising configuring the client to monitor the content item as stored at the client to determine whether the threat pattern has been matched.

9. The method of claim 8, wherein configuring the client to monitor the content item as stored at the client includes installing a critical content protection plugin at the client.

10. The method of claim 1, wherein the indication that a threat pattern associated with a content item has been matched comprises an indication that an attempt has been made to access the content item at a time that was not an authorized time.

11. The method of claim 1, wherein the indication that a threat pattern associated with a content item has been matched comprises an indication that an attempt has been made to access the content item using a system that was not an authorized system from which to access the content item.

12. The method of claim 11, wherein the indication comprises at least in part an attempt to access the content item from an IP or other address that is not authorized.

13. The method of claim 1, wherein the indication that a threat pattern associated with a content item has been matched comprises an indication that an attempt has been made to perform with respect to the content item an operation that is not authorized to be performed at the client.

14. The method of claim 1, wherein the indication that a threat pattern associated with a content item has been matched comprises an indication that an attempt has been made to access the content item at a location that was not an authorized location.

15. The method of claim 13, wherein the operation comprises one or more of the following: a cut operation; a copy operation; a file copy operation; an operation to open the content item using an application or reader that is not authorized; and attaching the content item to an email or other external communication.

16. A system, comprising:
a storage device configured to store a content item; and
a processor coupled to the storage device and configured to:
  receive an indication that a threat pattern associated with the content item has been matched, wherein the threat pattern includes an unauthorized attempt to access the content item; and
  in response to receiving the indication that the threat pattern associated with the content item has been matched,
    send, to a remote server, a latest version of the content item as stored at a client, and
    auto-destruct the content item in a selected manner that corresponds to the matched threat pattern to render the content item inaccessible, wherein at least one other selected manner corresponds to an other threat pattern, and wherein at least one other content item is accessible at the client.

17. The system of claim 16, wherein the selected manner of auto-destructing the content item includes replacing the content item as stored at the client with an unusable format.

18. The system of claim 16, wherein the selected manner of auto-destructing the content item includes deleting a security data required to access the content item as stored at the client.

19. The system of claim 16, wherein the processor is further configured to extract and back up to a remote server a latest version of the content item as stored on the storage device.

20. The system of claim 16, wherein the processor is further configured to monitor attempts to access the content item to determine whether the threat pattern has been matched.

21. A computer program product to protect content, the computer program product being embodied in a tangible non-transitory computer readable storage medium and comprising computer instructions for:
receiving an indication that a threat pattern associated with a content item has been matched, wherein the threat pattern includes an unauthorized attempt to access the content item; and
in response to receiving the indication that the threat pattern associated with the content item has been matched,
  sending, to a remote server, a latest version of the content item as stored at a client, and
  auto-destructing the content item in a selected manner that corresponds to the matched threat pattern to render the content item inaccessible at the client, wherein at least one other selected manner corresponds to an other threat pattern, and wherein at least one other content item is accessible at the client.

* * * * *